Nov. 2, 1926.
C. F. EHRENTRAUT
OUTAGE GAUGE
Original Filed June 26, 1918
1,605,821
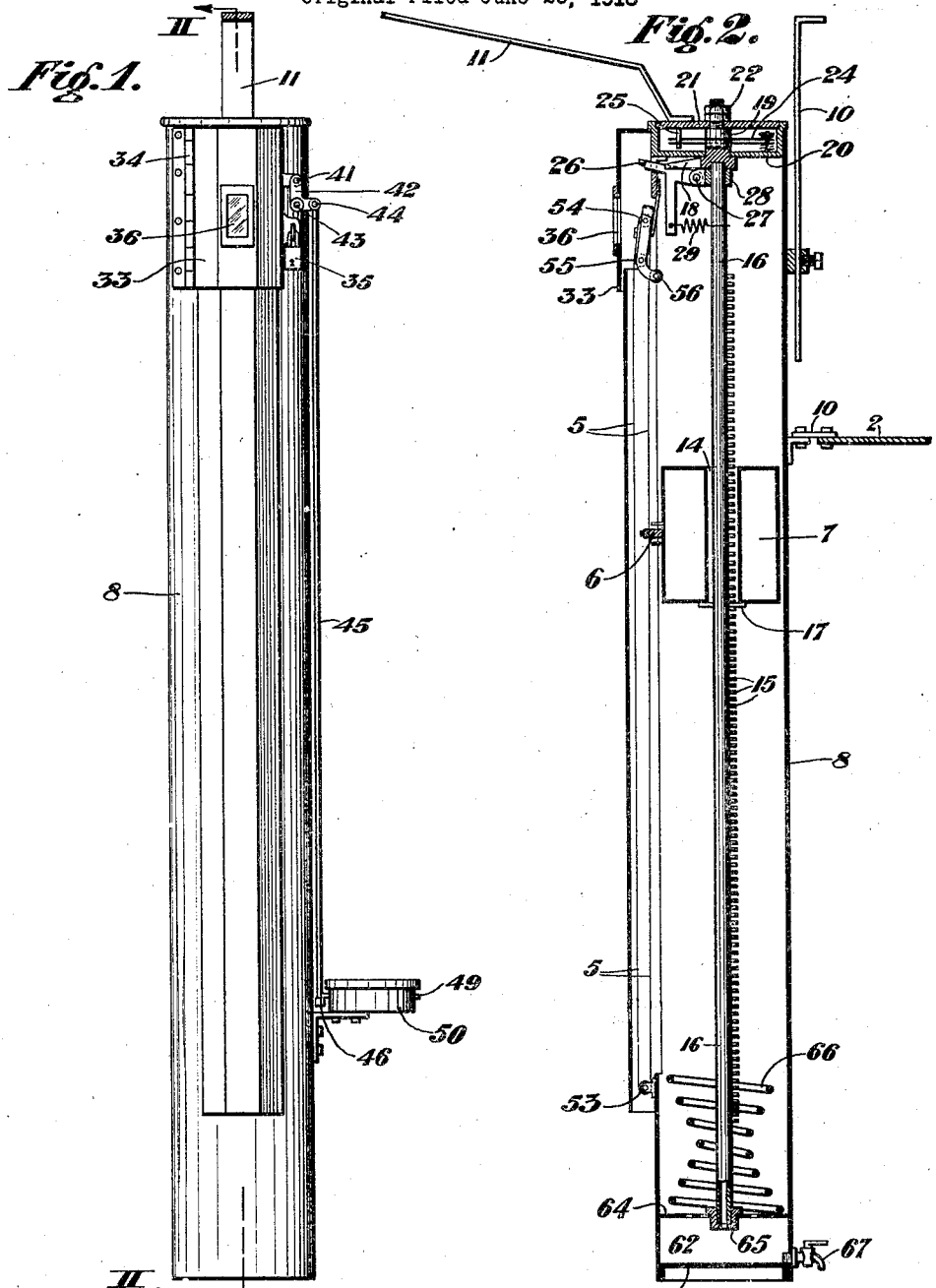

Patented Nov. 2, 1926.

1,605,821

UNITED STATES PATENT OFFICE.

CHARLES F. EHRENTRAUT, OF PITTSBURGH, PENNSYLVANIA.

OUTAGE GAUGE.

Original application filed June 26, 1918, Serial No. 241,941, Patent No. 1,417,892. Divided and this application filed May 4, 1922. Serial No. 558,336.

My invention relates to improvements in outage gauges of the type disclosed in my pending application filed June 26, 1918, Serial No. 241,941, now issued as Patent No. 1,417,892 of May 30, 1922, and constitutes a division thereof. Generally stated, the gauge itself is for the purpose of indicating the level of the contents of a tank car or similar vessel for use in connection with such cars in the shipment of volatile liquids, as gasoline, naphtha, and the like.

Ordinarily, in connection with the shipment of such liquids in the usual cylindrical tank cars provided with the ordinary dome, there occurs more or less shrinkage due to evaporation, leakage, etc., known as "outage." Under certain circumstances, there is also at times an apparent accretion of liquid, due to expansion, known as "domeage."

The invention comprises an indicating mechanism adapted to be located in the tank car, utilizing a float which assumes the level of the liquid when at rest at all times, and which is so arranged as to be positively fixed in position at the time that the cap of the dome is removed, when the contents are discharged. The float is freely mounted within a holding casing and provided with a coacting attached flexible scale, observable for reading at a predetermined point, so that when the float is arrested at or before the time of discharge of the contents, the scales will also be arrested and held, and will accurately indicate the level of the liquid at the time of arrival of the car at its destination, or when about to be emptied.

The device also embodies means for ascertaining and registering the temperature of the contents at the time of arrival or discharge and also for making a record of the gravity of the contents and for segregating a sample of the original contents.

The latter feature is the especial subject matter of the present application, it being understood that it is intended to be incorporated and used with the outage gauge as a whole.

The entire mechanism is so constructed as to be operable by the dome cap upon unscrewing, and to be effectively locked in position when so set as to effectually prevent accidental release of the float, means also being provided for cushioning the float upon the top of the isolated sample chamber herein involved.

The general construction of the device and the particular feature herein involved are illustrated in the accompanying drawing, in which,—

Fig. 1 is a view of the complete outage gauge in elevation from the front; and

Fig. 2 is a vertical sectional view therethrough indicated by the line II, II of Fig. 1.

The body portion of the outage gauge is composed of a preferably cylindrical shell 8 within which is mounted the buoyant rising and falling float 7 connected by clamp 6 to the flexible tape gauge or measure 5 provided with suitable indicia or markings which indicate the contents. The float 7 is of any suitable buoyant material, as cork, or of an air tight sheet metal construction, as shown, which is preferably cylindrical in form and fits freely within the interior of the casing.

The casing is located slightly above the bottom of the tank car and may be fixedly secured in place by any suitable means, as connections 10, 10. The casing is of sufficient length to extend into the interior of the dome of the tank car adjacent its top, and is placed toward one side of the dome whereby to locate the actuating lever 11 of the operating mechanism within the path of the rotating pin extending downwardly from the dome cover, not shown.

Float 7 is centrally apertured vertically throughout its length, providing an opening 14 which is preferably segmental in cross section and providing for a range of lateral movement of the locking pins 15 of a pin shaft or stem 16. Stem 16 is arranged for partial rotation under movement imparted by the projecting pin of the dome cover, ineffectually when the door is screwed in place, but effectively to arrest and lock the float when it is unscrewed.

Pins 15 extend laterally in alinement throughout the operative portion of the stem co-extensive with the range of movement of float 7, and are adapted to be thrust around laterally and to engage, in the limited space between adjacent pins, an arresting plate 17 at one or both ends of the float. Normally, pins 15 extend in a non-registering direction with relation to plate 17 so that float 7 is free to rise and fall within its casing with the liquid contents of the tank car, except when stem 16 is thrust around by action of the dome cap in unscrewing to open the car. In such case, the float is positively arrested, and its position in the casing and the depth of the contents of the car is indicated by the outage gauge 5, through aperture 36.

Stem 16 is pivoted in any suitable step bearing 65 at its lower end and at its top is fixedly secured to a lever 18 having a hub and stem 19 which is rotatably mounted centrally of the top 20 of casing 8. In the upper portion of top 20 is a freely rotatable disk 21 fixedly connected with the upper end of stem 19 by nuts 22, so that as disk 21 is rotated in one direction or the other, corresponding movement will be imparted to stem 19 and lever 18.

Lever 11 is secured to disk 21 and extends into the path of the abutment pin, extending from the dome cover. As the cover is screwed in position in closing the dome, pin 12 engages against one side of lever 11 and throws it partially around inoperatively, the lever being returned to its normal middle position by action of springs 24.

The locking lever 26 is pivoted at 27 to hub 28 secured to stem 16, lever 26 being normally held downwardly by spring 29 so that the lever may act to rotate stem 16 to fixedly hold the float upon unscrewing the cover, as clearly explained in my previous application.

At the lower portion of the casing 8 I provide an isolated chamber 62 located between a closing bottom 63 and an upper perforate diaphragm 64, in the center of which is provided the step box 65 for the partly rotatable stem 16. Upwardly beyond partition or diaphragm 64 is a resilient spring 66 adapted to cushion the float 7 when it is dropped, after the contents of the tank have been emptied.

Chamber 62 is utilized to collect a segregated sample of the main contents of casing 8 and of the tank car in which it is used, which sample may be withdrawn through a cock or valve 67. By this construction I am enabled to segregate and collect an isolated sample of the particular contents in which the user of the device is interested, and it is impossible to substitute in the chamber 62 the contents of a different quality from those originally stored in the tank car without easy detection by comparison with such sample.

The advantages of the invention will be readily understood and appreciated by all those familiar with the custom of shipment of volatile liquids and the uncertainties and difficulties of accurately determining or agreeing upon the amount of loss or deterioration in shipment, and the invention is particularly useful in connection with the means above described for collecting the sample of the particular shipment of fluid involved.

What I claim is:

1. In an outage gauge of the class described, the combination with the main casing having a closed bottom, of a perforated diaphragm located upwardly above the bottom across the interior of the casing providing an isolated sample chamber, and a drain cock or valve opening into the sample chamber between the bottom and the perforated diaphragm.

2. In an outage gauge of the class described, the combination with the main casing having a closed bottom, of a perforated diaphragm located upwardly above the bottom across the interior of the casing providing an isolated sample chamber and having a central step box bearing, and means for drawing off the contents of the chamber.

In testimony whereof I hereunto affix my signature.

CHARLES F. EHRENTRAUT.